Figure 1:
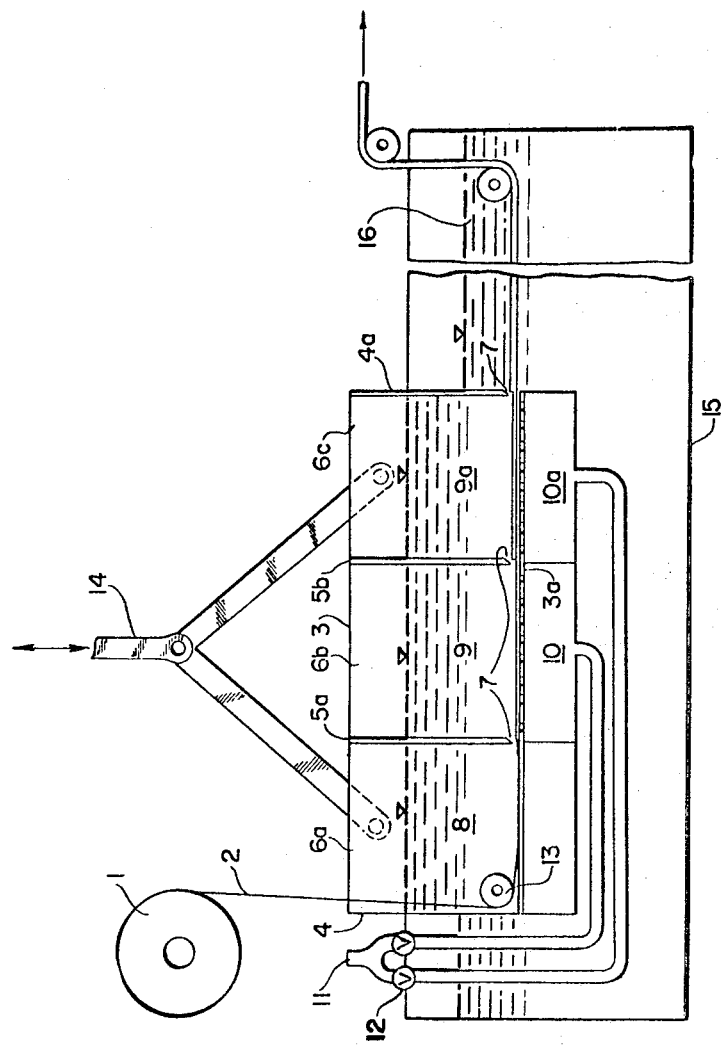

United States Patent [19]

Beissel et al.

[11] 3,832,973

[45] Sept. 3, 1974

[54] APPARATUS FOR THE PRODUCTION OF A MULTI-LAYER SHEET MATERIAL OF MICROPOROUS STRUCTURE

[75] Inventors: Dieter Beissel, Wiesbaden; Peter Dinter, Wiesbaden-Biebrich; Klaus Andrä, Eschenhahn, all of Germany

[73] Assignee: Kalle Aktiengesellschaft, Wieskaden-Biebrich, Germany

[22] Filed: Sept. 25, 1973

[21] Appl. No.: 400,501

Related U.S. Application Data

[60] Continuation of Ser. No. 135,460, March 22, 1971, abandoned, which is a division of Ser. No. 6,214, Jan. 27, 1970.

[52] U.S. Cl. .................................. 118/50, 118/419
[51] Int. Cl. ........................................... B05c 3/132
[58] Field of Search .......... 118/405, 404, 419, 415, 118/50, 50.1; 117/114–115, 119

[56] References Cited
UNITED STATES PATENTS

| | | | |
|---|---|---|---|
| 1,587,652 | 6/1926 | Johnston | 118/50 X |
| 1,728,471 | 9/1929 | Bratring | 118/415 X |
| 1,747,940 | 2/1930 | Kienle | 117/115 X |
| 2,209,950 | 8/1940 | Nai | 118/429 X |
| 2,319,639 | 5/1943 | Simpson | 118/405 |
| 2,393,678 | 1/1946 | Graham | 118/405 |
| 2,424,034 | 7/1947 | Hopper | 118/429 X |
| 2,430,474 | 11/1947 | Marshall | 118/429 X |
| 2,445,675 | 7/1948 | Lang | 118/405 UX |
| 3,002,849 | 10/1961 | Harmon et al. | 118/415 UX |
| 3,533,761 | 10/1970 | Pierson | 117/115 X |

Primary Examiner—Morris Kaplan
Attorney, Agent, or Firm—James E. Bryan, Esq.

[57] ABSTRACT

This invention relates to an apparatus for use in the production of multi-layer sheet material which comprises a reservoir, container means in the reservoir, means for raising and lowering the container means in the reservoir, at least one partition in the interior of the container means, slot means in the partition and one end wall of the container, and means for passing a web through said slot means.

4 Claims, 2 Drawing Figures

APPARATUS FOR THE PRODUCTION OF A MULTI-LAYER SHEET MATERIAL OF MICROPOROUS STRUCTURE

This is a continuation of application Ser. No. 135,460, filed Mar. 22, 1971, now abandoned, which, in turn, is a division of Ser. No. 6,214, filed Jan. 27, 1970.

The present invention relates to apparatus for the production of a multi-layer sheet material comprising a textile supporting web carrying on one surface thereof a microporous layer or several superimposed microporous layers of polymeric material.

For the production of microporous layers of high-polymer material on a textile support comprising, e.g., a fabric or a chemically bonded fiber fleece, a process is known in which a highly fluid polyurethane solution is applied, by means of a doctor knife, to one surface of a fiber fleece or a fabric which serves as the support, and the polymer is then precipitated from the solution by the action of steam on the polymer solution, to form a continuous layer on the support which assumes a microporous structure.

This known process has the disadvantage that coagulation is effected substantially unilaterally, from the side of the polymer layer which is away from the support, but not from the side facing the support, which necessarily results in long coagulation times. As a further drawback of this known process, undesirable depressions are formed in the surface of the layer of polymer material, which are caused by the fact that the solvent driven from the coating by coagulation settles in the form of pools on the microporous polymer layer while it is still easily deformable. In addition to the drawbacks already mentioned, this known process requires much time and expensive apparatus, so that its performance is very expensive.

In another known process, a polymer solution is also applied, by means of a doctor knife, to the flat, horizontally advancing supporting material, and the coated supporting material is then introduced into a coagulation liquid while it is transported at a specific angle of inclination. Due to this particular method of preparation, this process is restricted to polymer solutions of relatively high viscosity, because, when the coated supporting material is deflected from its horizontal direction to a sloping direction, a flow structure is inevitably formed in the layer of the polymer solution, which results in an irregular and thus objectionable surface structure of the layer after the polymer coating has hardened. As a further drawback of this process, interfacial tensions occurring between the liquid serving as the coagulation medium and the layer of the polymer solution on the support when the coated web is immersed in the coagulation medium, cause the formation, on the surface of the polymer layer, of structures which extend transversely to the direction of feed of the web. By these structures, the quality of the coated material is considerably reduced.

Further, this known process has the disadvantage that the supporting material may be superficially swollen by the solvent contained in the polymer solution. Primarily, this causes an alteration of the surface of the supporting material which, secondarily, results in an undesirable alteration of the surface of the layer of the polymer solution. This annoying change in the surface structure of the layer is fixed in the microporous top layer of high polymer material when coagulation begins.

In addition to these known processes, in which a layer of a polymer solution is directly applied to the supporting material and the polymer is then coagulated, a further process is known in which the microporous layer of the polymer material is produced in a separate process step, using a temporary supporting material, and is then combined with the textile support by a second process step. This process has the disadvantage that the microporous layer must be united with the textile support by laminating, if necessary with the additional application of adhesives.

The present invention avoids the drawbacks of the known processes and provides apparatus by means of which a multi-layer sheet material consisting of a textile supporting web carrying on one surface thereof at least one layer of a polymer material of microporous structure can be produced in a simple manner.

The apparatus for the production of a multi-layer sheet material, comprising a textile supporting web carrying on one surface a microporous layer or several microporous layers of polymer material, in which one layer or several superimposed layers of polymer material dissolved in a solvent are applied to the surface of the textile supporting material and the polymer contained in the layer or layers is then coagulated by the action of a precipitating agent which does not dissolve the polymer, whereupon the coated web is dried, is distinguished in that, as a first step, the textile supporting material is impregnated with a liquid; the impregnated material, while still wet, is then coated on one surface with a solution of the polymer by a second step; and, as a third step, a precipitating agent is caused to act from all sides upon the coated sheet material immediately after the polymer layer has assumed its final shape.

The layer or layers to be formed on the supporting material may be produced by one or more applications of a polymer solution of a definite chemical composition and viscosity.

In special cases, however, it is of advantage to apply different polymer solutions to the supporting web in several successive applications, the difference in the polymer solutions being either in the chemical compositions of the polymers dissolved, and/or in the viscosity of the polymer solutions, and/or in the concentration of the solids contained in the solutions.

The apparatus according to the present invention and the manner of using the same are described in the following:

The textile supporting web unrolled from a delivery spool is introduced into the open side of a container holding an impregnating liquid and conducted, by means of a guide pulley mounted near the bottom of the container, in a straight, horizontal direction beneath the surface of the impregnating liquid; the impregnated web is then passed through a straight, horizontal slot in the end wall of the container which extends in a substantially transverse direction to the direction of feed of the web, and directly enters a slot in a second container holding the liquid polymer solution. The web is then further conducted, without changing its former direction and beneath the liquid level of the polymer solution, through the container and near its bottom in a straight direction. The two slots just mentioned are superposed so that they coincide with each other and their height corresponds substantially to the thickness of the supporting web or is only slightly greater. The width of the slots corresponds substantially to the width of the supporting web. Through a straight, horizontal slot in the opposite end wall of the second container, which is substantially at the same level as the slot in the first container, and the edges of which act as a doctor knife, while its height corresponds to the thickess of the supporting web plus the desired thickness of the layer of polymer solution, the coated web, which is still fed in a straight and horizontal direction, immediately enters a reservoir containg a liquid precipitating agent having a coagulating action, the outlet slot in the end wall of the second container being positioned beneath the level of the precipitating agent. The lower edges of the slots in the end walls are at the same level.

If, in accordance with a particularly advantageous modification of the apparatus, the supporting material is to be provided with two super-imposed layers of microporous structure, in which case the first-applied layer may comprise a polymer which differs chemically from the one contained in the layer coated on top of it, and/or the two layers may differ in their viscosity and/or solids content and/or filler content, by passing the web carrying the layer of the polymer solution first applied thereto through the slot of the second container, determining the layer thickness, not directly into the precipitating bath, but first into a further container containing, e.g., a polymer solution which differs in its composition from the one contained in the container aready traversed by the web. The level of the polymer solution contained in the third container is adjusted so that the textile supporting web already provided with a layer of the polymer solution of the first composition enters the third container beneath the surface of the polymer solution. The textile web continues its straight course at the same level as in the other containers. When the web passes a further slot, which is horizontally positioned in the end wall of the third container, with its lower edge at the same level as the lower edges of the other slots, a second layer of polymer solution, which differs in its composition from the first layer, is formed on the web. The height of this slot corresponds to the thickness of the coated web, plus the desired thickness of the second polymer layer. When it leaves this slot, the textile web, which now carries two layers of polymer solutions of different compositions, is directly introduced into a precipitating liquid which it enters beneath the level of the bath and through which it passes until the polymer has coagulated. If desired, this modification may be performed in a manner such that more than two layers of polymer material are superimposed on the textile web. All that is required for this purpose is to arrange several containers with polymer solutions in a series.

For performing this preferred embodiment, the procedure is advantageously such that a single, e.g. rectangular, container of adequate size is used which is subdivided by one or more partitions extending parallel to each other and to the end walls of the container. The partition walls extend vertically upwards from the, preferably flat and horizontal, bottom of the container. By such an arrangement of the partition walls, the container is subdivided into several chambers. The partitions and the end wall of the container opposite to the end wall where the web enters the container, have straight, slot-like openings. These slots are arranged such that their respective lower edges are at the same level and the slots extend horizontally in the partition walls and the end wall of the container. Instead of slot-like openings in the partitions and in the end wall of the container, in a preferred embodiment of the apparatus, the slot-like openings are formed by gaps which are left between the lower edges of the partition walls and the end wall, respectively, and the bottom of the container.

The width of the slot-like openings corresponds substantially to the width of the textile supporting web. This is a characteristic feature not only of the special embodiment just described, but applies generally to the formation of the slots in the coating apparatus.

It is of particular advantage for the partitions of the container and, if desired, for the end wall provided with the slot to be of such construction that each of them may be individually lifted and lowered and may be fixed in its position which defines the desired height of the slot, so that layers of any desired thicknesses of polymer solution may be produced on the web. It is of particular advantage when the bottom of the chamber or chambers filled with the polymer solution is provided with perforations. In this case, there is a box beneath the perforated bottom, and the perforated bottom forms one wall of this box. A suction pipe equipped with a check valve opens into the box beneath the perforated bottom. By providing an evacuatable box under the bottom of the chamber or chambers, the penetration of the polymer solution into the textile support is facilitated. In a preferred embodiment of the apparatus, in which the height of the slot is defined by the bottom of the container and the lower edge of the partition wall or the end wall of the container, the textile supporting web, after having traversed the chamber of the container filled with the impregnating liquid, is deflected by a guide pulley in such a manner that it traverses the chamber with one of its surfaces in contact with the bottom of the chamber. At this level, the supporting web, which is now impregnated with the impregnating liquid, issues from the slot in the partition wall of the chamber containing the impregnating liquid and enters the next chamber containing the polymer solution. The height of the slot in the partition wall is adjusted such that it corresponds substantially to the thickness of the textile supporting web or is only slightly higher than the thickness of the web.

This latter feature applies not only to the particular case just described, but to all slots in the partition wall traversed by the textile supporting web as long as it remains uncoated.

In a particular advantageous modification, the precipitating liquid is contained in a reservoir over which the partitioned coating container is positioned in such a manner that it can be lifted and lowered, the dimensions of the reservoir and container being such that the container can be lowered into the reservoir with adequate clearance between the end walls of the container and the reservoir. At the beginning of the coating, shortly after the coated supporting web has issued from the slot-like doctoring opening in the end wall of the coating container, the container is lowered into the reservoir until the slot-like opening in the end wall of the container is beneath the level of the coagulating agent in the reservoir. With the container in this position, the coated textile web enters the precipitating liquid immediately after issuing from the slot and passes through the coagulating agent until the polymer contained in the layer has coagulated.

In a further preferred embodiment of the apparatus, the end wall of the coating container provided with the doctor-like opening is secured to one end wall of a reservoir containing the preciptating agent so that the coated textile web issuing from the doctor-like slot in the container wall enters the reservoir below the level of the coagulation liquid contained therein. The apparatus may be of such a type that the end wall of the coating container having the doctoring opening therein is flanged to one end wall of the coagulation reservoir which also has a doctor-like opening of the same dimensions as the slot in the wall of the coating container, the two slots being arranged in such a manner that they coincide with each other. In a further embodiment of the inventive apparatus, which is also of advantage, the neighboring end wall of the reservoir is connected in such a manner to the outer surface of the end wall of the container that the upper edge of the end wall of the reservoir ends in alignment with the lower edge of the slot-like opening in the end wall of the container. The side walls and the other end wall of the reservoir are sufficiently high to end above the level of the slot-like opening of the container.

Due to the fact that the outlet slot of the coating container is below the level of the coagulation liquid in the reservoir and that the coated supporting web issuing from the doctoring slot in the end wall of the container passes beneath the surface of the coagulating agent, no medium other than the liquid coagulating bath contacts the coated web after it has issued from the slot in the container, until the multilayer sheet material is removed from the coagulation bath when the polymer contained in the layer on the textile web has coagulated and forms a microporous top coating.

The textile sheet material provided with a microporous layer of polymer material is carefully washed and dried.

Suitable polymers for use in the production of the microporous layer on the textile support are polyamides, polyacrylonitrile, polymers of the vinyl series, and, above all, polyurethanes.

The polyurethanes are prepared by reacting polyethers, polyesters, or polyether esters containing OH groups in the end positions with di- or polyisocyanates in connection with chain-lengthening. The process may be performed via the intermediate step of a prepolymer containing NCO groups, or by the so-called "one-shot" technique. The preparation of the polymers is no part of the present invention.

The solvents used for dissolving the above mentioned polymers and preparing the polymer solution which is applied in the form of a layer to one surface of the textile supporting web, are organic solvents, preferably those miscible with water. For the preparation of polyurethane solutions, strongly polar, water-miscible solvents are preferred, e.g. dimethyl formamide, dimethyl acetamide, N-methyl pyrrolidone, and dimethyl sulfoxide. Solutions of polyurethanes or of polyacrylonitrile or of mixtures of polyurethanes with vinyl polymers, e.g. polyvinyl chloride or polyvinyl acetate, in the above-mentioned polar solvents, preferably dimethyl formamide, are preferred for coating the textile supporting web. The polymer solution is of a pasty consistency and has a concentration of solid polymers ranging from 10 to 40 per cent by weight, based on the weight of the solution. Advantageously, the polymer solution has a content of solid polymers in the range of 25 to 35 per cent by weight.

Suitable textile supporting materials are woven or knitted materials, felts, fiber fleeces made of synthetic fibers, such as polyamides, polyesters, polyacrylonitrile, polyethylene, polypropylene, polyvinyl chloride or polyvinyl alcohol, or of natural fibers, such as cotton, or wool. Supporting materials consisting of mixtures of synethetic and natural fibers also may be used.

Suitable coagulating agents are liquids which do not dissolve the polymer contained in the polymer solution, but are miscible with the solvent used for dissolving the polymer. Further, the coagulating agents should not swell or dissolve the fibers of the textile support.

Water and mixtures of water with dimethyl formamide are preferred as coagulating agents. The dimethyl formamide content of such mixtures advantageously is in the range of 10 to 50 per cent by weight, preferably from 15 to 25 per cent by weight, based on the weight of the mixture.

When the coating paste comprises a polymer solution composed of a polyamide dissolved in alcohol, water or a mixture of water and alcohols, is preferably used as a coagulating agent.

It has proved to be of particular advantage to have the coagualting agent act on the coated supporting web at temperatures ranging from 20° to 60° C.

Advantageously, the textile web entering the coating apparatus is preliminarily impregnated in the first chamber of the apparatus. This impregnation serves the purpose of rendering the textile web flexible and improves its wettability during the following coating process. Preferably, the web is impregnated with the same solvent which is also contained in the coating paste. Thus, when a polyurethane solution is used for coating, dimethyl formamide is used as the liquid impregnating agent, if desired in admixture with water, mixing proportions of dimethyl formamide and water ranging from 1:1 to 4:1 by weight being preferred.

Further, the invention affords the possibility of incorporating binders into the textile supporting web. For this purpose, a solution consisting of polymer materials dissolved in solvents is used as the impregnating liquid. Polyurethanes are particularly suitable as polymer materials for this purpose.

For impregnating the textile support for the purpose of binding, it is advantageous to use a polymer solution containing the same polymer which is also used for the preparation of the solution to be applied as a pasty layer to one surface of the textile support.

In the case of a solution of polyurethane in an organic solvent, the liquid medium used for impregnating the textile support has a solids content of 10 to 30 per cent by weight, based on the weight of the solution.

The polymer solution used for coating the textile support, as well as the liquid impregnating medium, may be modified by the addition of fillers, pigments, plasticizers and other auxiliary agents.

Of course, the preliminary impregnation of the textile supporting web with an impregnation liquid may be omitted when the textile web to be coated displays a satisfactory suppleness and/or wettability when it enters the coating apparatus.

By the invention, multi-layer sheet materials are produced which comprise a textile support and at least one microporous polymer layer on one surface thereof, which sheet materials are distinguished by their flexibility and the pleasing exterior of the coated layer and which, after the customary finishing process, may be used instead of natural leather for the preparation of uppers, upholstery leathers, fancy leathers for bags, and the like.

The invention has the following advantages:

1. Immediately after the pasty layer of the polymer solution applied to one surface thereof has assumed its final shape, the coated textile supporting web is contacted from all sides with the liquid having the coagulating action.

2. Coagulation of the layer of polymer solution applied to the textile support is effected from two sides, viz. a) from the surface of the layer of polymer solution away from the surface of the support, and b) from the surface of the layer of polymer material facing the surface of the supporting material, because the coagulating agent penetrates the supporting web.

3. The layer of pasty polymer solution applied to one surface of the textile support contacts the liquid coagulating agent immediately after the layer has assumed its final shape, so that there is no possibility for the solvent contained in the polymer layer to swell the support.

By the coagulation of the polymer, the solvent separates from the polymer solution and is absorbed by the liquid coagulating agent.

In a particularly advantageous embodiment, the apparatus according to the invention for performing the continuous process comprises a rectangular, open container with a flat bottom and side walls of substantially the same height. The container is provided with a mechanism for vertically lifting and lowering it. Further, the apparatus contains an open reservoir with a flat bottom and side walls of substantially the same height. The container is positioned over the open reservoir and the latter is of such dimensions that the container may be lowered into the interior of the reservoir by means of a lifting-and-lowering mechanism. A delivery spool for the supporting web is mounted over the container. The container is provided with several partition walls which extend vertically to the level of the container bottom; they are arranged parallel to each other and at a distance from each other and parallel to and at a distance from the end walls of the container. The partition walls and one of the end walls of the container are of a construction such that they can be lifted and lowered. They may be fixed in any desired position. In the vicinity of the bottom and near the end wall of the one of the chambers of the container whose end wall cannot be lifted and lowered, there is a guide pulley the axis of which extends parallel to the end wall. Between the end wall of the container capable of being lifted and lowered and the neighboring end wall of the reservoir there is an adequate distance. One or more chambers of the container preferably have perforated bottoms. Under the perforated bottom, there is a closed box one surface of which is formed by the perforated bottom. A suction pipe with a check valve opens into this box.

A further, particularly advantageous apparatus for performing the process of the invention comprises the above-described container which, in this case, is without a lifting-and-towing mechanism, and lifting-and-lowering rectangular reservoir the end walls of which are at least as wide as the outlet slot in the end wall of the container. Two side walls and one of the end walls of this reservoir are substantially of the same height, whereas the other end wall of the reservoir is lower than the other walls thereof. In this case, the reservoir is closely secured, with its lower end wall, to the end wall of the container which contains the outlet slot in such a manner that the upper edge of the lower end wall of the reservoir ends in alignment with the lower edge of the outlet slot in the end wall of the container.

Figure 2:
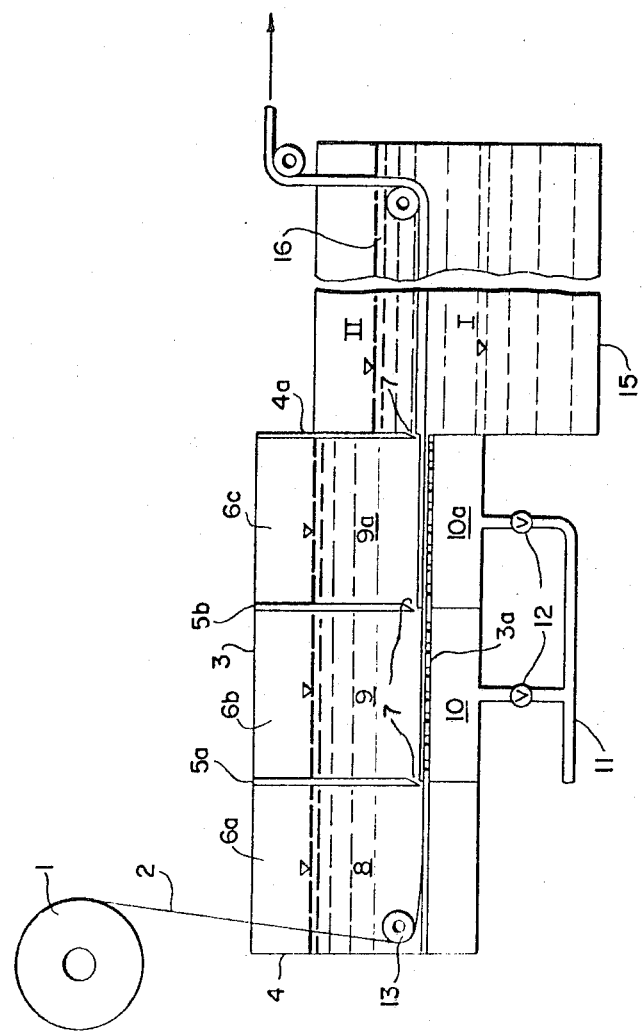

In the drawings, FIG. 1 and FIG. 2 illustrate the preferred apparatuses.

FIG. 1 is a diagrammatic representation, in longitudinal cross-section, of a container capable of being lifted and lowered, which is subdivided into separate chambers by partitions and may be lowered into a reservoir of appropriate size below the container. In one of its end walls, the container has an outlet slot. Between the bottom of the container or the container chamber, respectively, and the lower ends of the partitions and one of the end walls, there are slot-like openings. The bottom of the container or the container chamber forms the lower boundary of this slot-like opening. During the coating process, the container is sufficiently lowered into the reservoir, which is filled with liquid, that the outlet slot in the end wall of the container is below the level of the liquid in the reservoir.

FIG. 2 shows the same container as in FIG. 1, but without a lifting-and-lowering machanism, and the reservoir has two side walls and one end wall of the same height, whereas the second end wall is lower than the other walls. This end wall of the reservoir is closely secured to the end wall of the container provided with the slot-like opening in such a manner that the upper edge of the lower end wall of the reservoir ends in alignment with the lower edge of the slot-like opening in the end wall of the container. The other walls of the reservoir extend to such a height that their upper edges are above the slot in the end wall of the container.

Referring now to FIG. 1, 1 is a take-off roll from which the textile supporting web is drawn. Vertically to the plane of the opening, the web runs into an open, rectangular coating container 3 which has a flat bottom 3a and vertical side walls of substantially the same height. The end walls of the container are designated as 4 and 4a. The container is subdivided into the chambers 6a, 6b, and 6c by partitions 5a and 5b. The partitions extend vertically to the plane of the container bottom and parallel to the end walls thereof. The partitions, which may be fixed in their positions, end shortly above the surface of the container bottom. The slot-like openings thus formed are designated as 7. In this construction, the partition 5b has the function of a doctor knife. In a similar manner, the end wall 4a of the container ends shortly above the bottom so that there is also formed a slot-like opening 7. The last-mentioned slot-like opening is the outlet opening through which the coated textile supporting web leaves the container. This opening imparts the final shape to the layer of polymer solution applied. The height of the slot determined by the bottom surface 3a and the lower edge of the partition 5a corresponds substantially to the thickness of the supporting web. The height of the slot determined by the bottom surface 3a and the lower edge of the partition 5b corresponds to the thickness of the web plus the desired wet thickness of the polymer solution and is less than the height of the outlet slot determined by the bottom surface 3a and the lower edge of the end wall 4a. The bottoms of chambers 6b and 6c are perforated. Chamber 6a is filled with an impregnating liquid 8, chamber 6b with a polymer solution 9, and chamber 6c with a polymer solution 9a which differs chemically from polymer solution 9.

Boxes 10 and 10a, which are arranged under the perforated bottoms of the chambers in a manner such that the perforated bottom of the chamber forms one side thereof, may be evacuated. For this purpose, they are connected to a suction pipe 11 equipped with check valves 12 so that each box may be subjected separately to a more or less reduced pressure.

In chamber 6a, a guide pulley 13 is pivotally mounted near the bottom and adjacent to the end wall of the container, with the axis of the guide pulley extending parallel to the end wall. Numeral 14 indicates a mechanism for the vertical lifting and lowering of the container 3. Numeral 15 indicates an open rectangular reservoir in which the coagulating liquid 16 is contained. The container 3 is lowered sufficiently into the reservoir 15 that the outlet slot 7 of the container is below the level of the coagulating medium 16. By means of the lifting mechanism 14, the container 3 may be lifted from the reservoir before or after the coating process to such a height that the outlet slot 7 of the container is higher than the level of the liquid in the reservoir 15.

In the use of the apparatus of the invention, the textile supporting web unwound from the take-off roll is introduced at a constant speed into the chamber 6a where it is deflected by the guide pulley 13 in such a way that it continues its passage in a horizontal direction with one surface thereof in contact with the bottom of the chamber 6a. Subsequently, the respective liquids are added to the different chambers. The supporting web, which is now impregnated with the impregnating liquid, leaves chamber 6a through the slot 7, which is of a height which substantially corresponds to the thickness of the supporting web, and enters the chamber 6b, still travelling in a straight, horizontal direction; chamber 6b is filled with a polymer solution. While it traverses this chamber, the supporting web is still in contact with the bottom of the chamber. The web leaves the chamber 6b through the slot 7 formed between the lower edge of the partition 5b and the bottom of the container. This slot has a height greater than the thickness of the web. When the web traverses this slot, a layer of the polymer solution is formed on the surface of the web. The thickness of the layer thus applied corresponds to the height of the slot, minus the thickness of the web. When leaving chamber 6b, the textile web — which now is provided with a layer of the polymer solution 9 — enters the chamber 6c. If the textile web is to be impregnated with the polymer solution, the height of the slot is adjusted such that it substantially corresponds to the thickness of the textile web. The polymer solution 9a contained in this chamber may differ in its chemical composition from the polymer solution in chamber 6b. The level of the liquids in the chambers 6a, 6b, and 6c is adjusted so that all liquids have substantially the same level. The supporting web traverses the chamber 6c travelling along the bottom thereof and leaves it through the outlet slot 7 in the end wall of the container. This slot, which is determined by the upper surface of the bottom of the chamber 6c and the lower edge of the end wall 4a of the container, has a height greater than the thickness of the supporting web plus the layer of polymer solution 9 first applied thereto. The height of this slot determines the thickness of the polymer layer 9a applied to the web as a second coating.

After leaving the outlet slot 7 in the end wall 4a of the container and while still travelling at the level of this slot, the textile supporting web, which now is provided with two super-imposed layers of different polymer solutions, enters the reservoir 15 beneath the surface of the coagulating agent 16 contained in the reservoir. In this manner, the supporting web carrying the layers of polymer solutions is immediately surrounded on all sides by the coagulating medium when it leaves the slot 7 in the end wall of the container.

After traversing the coagulating bath 16 in this arrangement, the textile supporting web, which now carries two microporous layers of polymeric material due to the coagulation of the polymers, is deflected upwards by means of a guide pulley and removed from the reservoir 15, whereupon it is washed and dried in subsequent process steps.

In FIG. 2, the numerals 1, 2, 3, 4, 4a, 5a, 5b, 6a, 6b, 6c, 7, 8, 9, 9a, 10, 10a, 11, 12, 13, 15, and 16 have the same meaning as in FIG. 1. Further, in FIG. 2, the level of the coagulating bath 16 in the reservoir 15 is designated as I; it is adjusted before the process begins and after the coating process has been performed. Numeral II designates the level of the bath as it is maintained during the coating process.

The invention will be further illustrated by the following examples. In all examples, the supporting web is conducted at a constant speed through the coating apparatus and the coagulating bath.

EXAMPLE 1

For the preparation of the polymer solution, 5,650 g of 4,4'-diphenylmethane diisocyanate ("Desmodur 44," a product of Farbenfabriken Bayer, Leverkusen, Germany) and 14,350 g of a polyester of adipic acid and dibutylene glycol, having an OH-number of 66, are reacted for 30 minutes at a temperature of 75° C. to form a pre-polymer with an NCO group content of 6.2 per cent by weight. The prepolymer is dissolved in 52,000 g of anhydrous dimethyl formamide, and mixed first with 3,600 g of pulverized cellulose and 400 g of carbon black, and then with a mixture of 750 g of water and 4,000 g of dimethyl formamide. A polyurethane solution containing a filler is thus obtained which has a viscosity of 10,000 cp and a total solids content of 30 per cent by weight.

A 1 mm thick web of a non-woven fabric consisting of a matted fleece of polyester fibers of 1 – 2 denier chemically bound by means of an acrylonitrile-butadiene copolymer is continuously introduced into the coating container and passed through two slots formed by the lower edges of the partition walls 5a and 5b of the coating apparatus according to FIG. 1 of the drawings, on the one hand, and the bottom of the container, on the other hand. The partition walls 5a and 5b are of such construction that their lower edges touch the surface of the fleece, whereas the lower edge of the end wall 4a, which is in the form of a doctor knife, ends 1.0 mm above the surface of the fleece. The polymer solution, prepared as described above, is filled into chambers 6b and 6c and is designated in chamber 6b as 9 and in chamber 6c as 9a. Chamber 6a is then filled with an impregnating liquid 8 consisting of 50 parts by volume of water and 50 parts by volume of dimethyl formamide.

At the beginning of the coating operation, when the web issues from slot 7 in the end wall 4a of the coating container, the coating container is lowered into the coagulation bath 16, contained in the reservoir 15, and consisting of water at 20° C., in such a manner that the slot-like opening 7 in the end wall 4a of the container is below the level of the liquid 16 in the reservoir 15. In this manner, the coated web issuing from the coating container immediately enters the coagulation medium and is surrounded by it on all sides. While the coated web traverses the coagulating bath 16, the polymer dissolved in the polymer solution is coagulated. By means of a pair of guide pulleys, the coated web is conducted out of the bath 16 and the reservoir 15. After it has left the coagulation bath, the web, provided with the polymer layer, is rinsed with fresh water in a further process step in order to remove an excess of solvent from the polymer layer, and is finally dried at 110° C. in a drying cabinet.

In the manner described, a flexible laminated material is obtained which consists of a bound fiber fleece with a microporous polyurethane layer thereon, which adheres firmly to the surface of the fleece and forms a smooth surface. The permeability to air of this material corresponds to 200 $1/dm^2$ over 24 hours, and its permeability to water vapor to 3 $mg/cm^2$ per hour. The laminated material possesses very good tearing strength, abrasive resistance, and repeated flexural strength. It may be used as a leather substitute for the manufacture of uppers.

EXAMPLE 2

The procedure described in Example 1 is repeated, using the apparatus according to FIG. 1 of the drawing, with the exception that the impregnating liquid 8 in chamber 6a is a mixture of 50 parts by volume of acetone and 50 parts by volume of water, and that the coagulating agent 16 is a mixture of 80 parts by volume of acetone and 20 parts by volume of water having a temperature of 20° C. A microporous laminated material is thus obtained which has substantially the same properties as the material obtained according to Example 1.

EXAMPLE 3

8,000 g of the filler-containing polyurethane solution produced as described in Example 1 are mixed, with stirring, with an additional 1,600 g of powdered cellulose. The highly viscous paste thus produced has a viscosity of 400,000 cp. This paste is filled into chamber 6b of the coating apparatus according to FIG. 1 of the drawings and is designated as 9, whereas chamber 6c is filled with the paste prepared as described in Example 1, which is designated as 9a. Chamber 6a contains the impregnating liquid 8, which consists of 50 parts by volume of dimethyl formamide and 50 parts by volume of water. The lower edge of the partition 5a touches the surface of the fleece. The lower edge of partition 5b ends 0.5 mm above, and the lower edge of the wall 4a 1.0 mm above, the upper surface of the fleece.

By operating in accordance with Example 1, a multilayer material is produced consisting of a fiber fleece bound with a polymer which carries two microporous layers of polyurethane on one surface thereof. The permeability to air of the multi-layer material is 150 $1/dm^2$ over 24 hours; its water vapor permeability is 3.5 $mg/cm^2$ per hour. The laminate is distinguished by an even surface of the polymer layer and by its excellent repeated flexural strength.

EXAMPLE 4

For the preparation of the polymer solution, 4,900 g of 4,4'-diphenylmethane diisocyanate ("Desmodur 44," a product of Farbenfabriken Bayer, Leverkusen, Germany) and 15,100 g of an anhydrous polyester of adipic acid and ethylene glycol, having an OH number of 56, are reacted for 40 minutes at 80° C. to form a pre-polymer containing 4.8 per cent by weight of NCO groups. By dissolving this pre-polymer in 176,000 g of dimethyl formamide and adding 650 g of water in 4,000 g of dimethyl formamide, a polyurethane solution is obtained which has a viscosity of 180 cp.

A matted fiber fleece consisting of Perlon fibers of 2 denier, having a weight of 160 $g/m^2$ and a thickness of 0.85 mm, produced in a carding machine, is introduced into a coating apparatus corresponding to FIG. 1 of the drawings. The lower edges of the partitions 5a and 5b in the container 3 touch the surface of the fleece, whereas the lower edge of the end wall 4a ends 1 mm above the surface of the fleece. After the chamber 6b has been filled with the above-described polyurethane solution of a viscosity of 180 cp and the chamber 6c has been filled with the filler-containing polyurethane solution of a viscosity of 10,000 cp, prepared in accordance with Example 1, a reduced pressure is produced in the box 10 by applying a vacuum thereto, and this reduced pressure acts through the perforated bottom 3a of the chamber 6b on the fleece lying thereon. Due to the reduced pressure, the penetration of the polyurethane solution into the fleece is facilitated. By the method described in Example 1, the fleece in the coating container is first impregnated in chamber 6b with the above-described polymer solution of a viscosity of 180 cp and then coated with the polyurethane solution of 10,000 cp, prepared as described in Example 1, which is contained in chamber 6c, by passing through slot 7 in the end wall 4a of the vessel 3.

Immediately after issuing from the slot 7 in the end wall 4a, the coated web enters the reservoir 15 containing the coagulating agent 16, which in this case consists of water at 20° C. The further procedure is as described in Example 1. In this manner, a multi-layer laminate is obtained which consists of a fleece which is bound by means of polyurethane and carries on one surface thereof a microporous polyurethane layer. The permeability to air of the multi-layer material is 170 $1/dm^2$ per 24 hours; its water vapor permeability corresponds to a value of 2.5 $mg/cm^2$ per hour. The multi-layer laminate thus produced is distinguished by its excellent resilience and high compound strength.

EXAMPLE 5

A cotton fabric of a thickness of about 1 mm and a weight of 150 $g/m^2$ is passed, as described in Example 1, through the apparatus corresponding to FIG. 1 of the drawings. The lower edges of the partitions 5a and 5b touch the surface of the fleece. The end wall 4a of the container 3 ends 0.5 mm above the surface of the textile web. Chamber 6a of the coating container 3 is filled with an impregnating liquid 8 consisting of 50 parts by volume of ethanol and 50 parts by volume of water. Chambers 6b and 6c are both filled with a 20 per cent solution, calculated on the solids content of polymer, of a copolyamide of caprolactam and Nylon 6,6 ("Ultramide" 6A, a product of Badische Anilin- & Soda-Fabrik, Ludwigshafen, Germany). As the coagulating agent 16, the reservoir 15 contains a liquid which consists of a mixture of 20 parts by volume of ethanol and 80 parts by volume of water. The coagulating bath is maintained at a temperature of 30° C. After the coated material has been rinsed with fresh water, the web carrying the microporous layer is dried, in a separate operation, in a drying oven at 80° C.

When the entire coating process is finished, the coating vessel 3 is lifted from the reservoir 15 to such a height, by means of the lifting-and-lowering mechanism 14, that the slot 7 in the end wall 4a of the container 3 is above the level of the liquid 16 in the reservoir 15. This measure is also taken after the coating operation described in Examples 1 to 4. The laminate produced according to Example 5 is very flexible and possesses a good permeability to air and water vapor. It may be used for the preparation of upholstery covers and garments.

It will be obvious to those skilled in the art that many modifications may be made within the scope of the present invention without departing from the spirit thereof, and the invention includes all such modifications.

What is claimed is:

1. Apparatus for use in the continuous production of multi-layer sheet material which comprises at least three containers horizontally-disposed in series with one another, all except the last of said containers having their bottoms in a common horizontal plane and adapted to contain a different solution for treating said sheet material in each container, common partitions dividing said containers from one another, said common partitions each forming a slot between its lower edge and the bottom of all except said last of said containers, aid slots having a width sufficient to accommodate the width of said sheet material and a height sufficient to accommodate the thickness of said sheet material plus the thickness of the layer of treating solution applied in the container preceding said slot, said last of said containers having a bottom substantially below the bottoms of the other of said containers to effect continuous immersion of both sides of said sheet material in the treating solution of said last of said containers as it passes from the slot between the next to the last of said containers and said last of said containers and through said treating solution in said last of said containers and transport means to serially pass said sheet material in a substantially horizontal plane through said containers and said slots and essentially along the bottoms of all but said last of said containers.

2. Apparatus in accordance with claim 1 wherein the last of the containers is sufficiently large to receive all of the others of said containers and said others of said containers are immersed in the treating solution in said last of said containers with the slot formed by the common partition between the next to the last of said containers and said last of said containers being in the end wall of said next to the last of said containers and below the level of said treating solution in said last of said containers.

3. Apparatus in accordance with claim 2 including means for lowering and raising the others of the containers in the last of said containers.

4. Apparatus in accordance with claim 1 wherein at least one of the containers between the first and last of said containers has aperture means formed in the bottom thereof and means for applying a partial vacuum is operatively coupled to said aperture means.

* * * * *

UNITED STATES PATENT OFFICE
CERTIFICATE OF CORRECTION

Patent No. 3,832,973  Dated September 3, 1974

Inventor(s) Dieter Beissel, Peter Dinter and Klaus Andrä

It is certified that error appears in the above-identified patent and that said Letters Patent are hereby corrected as shown below:

On the covering page of the patent, the following should be added:

[30] Foreign Application Priority Data
January 29, 1969  Germany. . . . . . . . . 19 04 278.5

Column 3, line 12, "containg" should read - - - containing - - -.

Column 7, line 68, delete "lifting-and-", second occurrence, and "towing" should read -- lowering --.

Column 8, line 1, delete "lowering" and substitute - - - a - - -.

Column 14, line 4, "aid" should read - - - said - - -.

Signed and sealed this 4th day of February 1975.

(SEAL)
Attest:

McCOY M. GIBSON JR.
Attesting Officer

C. MARSHALL DANN
Commissioner of Patents